United States Patent [19]

Kepplinger et al.

[11] Patent Number: 5,535,991
[45] Date of Patent: Jul. 16, 1996

[54] PLANT FOR PRODUCING MOLTEN PIG IRON OR MOLTEN STEEL PRE-PRODUCTS

[75] Inventors: Werner Kepplinger, Leonding; Panajiotis Matzawrakos; Johannes Schenk, both of Linz; Dieter Siuka, Neuhofen; Christian Böhm, Wels, all of Austria

[73] Assignees: Voest-Alpine Industrieanlagenbau GmbH, Linz, Austria; Research Institute of Industrial Science & Technology, Incorporated Foundation, Pohang, Rep. of Korea

[21] Appl. No.: 461,711

[22] Filed: Jun. 5, 1995

Related U.S. Application Data

[62] Division of Ser. No. 139,528, Oct. 20, 1993.

[30] Foreign Application Priority Data

Oct. 22, 1992 [AT] Austria .................. 2096/92

[51] Int. Cl.$^6$ .................................................. C22B 5/14
[52] U.S. Cl. ............................................ 266/160; 266/172
[58] Field of Search ................................ 266/160, 172

[56] References Cited

U.S. PATENT DOCUMENTS 4,978,387  12/1990  Kepplinger .................. 75/445
5,185,032   2/1993  Whipp ........................ 266/172
5,229,064   7/1993  Kanetsuna ................... 75/444

*Primary Examiner*—Melvyn Andrews
*Attorney, Agent, or Firm*—Ostrolenk, Faber, Gerb & Soffen

[57] ABSTRACT

A process for producing molten pig iron or molten steel pre-products from charging substances formed of iron ores and fluxes and at least partially comprising fines, wherein the charging substances are directly reduced to sponge iron in at least one reduction zone by the fluidized layer process, the sponge iron is melted in a melting-gasifying zone under supply of carbon carriers and oxygen-containing gas, and a CO and $H_2$-containing reducing gas is produced, which is injected into the reduction zone, is reacted there, is withdrawn as an export gas and is supplied to a consumer, is to be improved with a view to rendering feasible the use of fine ore in an economic manner. This is effected in that primarily hematite and/or magnetite fine ores and/or ore dusts are subjected to preheating by the fluidized layer process in a preheating zone, the thus preheated charging substances are completely reduced to a major extent in at least one consecutively arranged reduction zone, whereupon at least the more finely particulate charging substances are charged into the fluidized bed and/or, if desired, also into the fixed bed, of the melting-gasifying zone by forced conveyance, preferably by pneumatic conveyance, and are melted there.

11 Claims, 3 Drawing Sheets

PLANT FOR PRODUCING MOLTEN PIG IRON OR MOLTEN STEEL PRE-PRODUCTS

This is a division of application Ser. No. 08/139,528, filed Oct. 20, 1993.

BACKGROUND OF THE INVENTION

1. Field of the Invention

The invention relates to a process for producing molten pig iron or molten steel pre-products from charging substances formed of iron ores and fluxes and at least partially comprising fines, wherein the charging substances are directly reduced to sponge iron in at least one reduction zone by the fluidized layer method, the sponge iron is melted in a melting-gasifying zone under supply of carbon carders and oxygen-containing gas, and a CO and $H_2$-containing reducing gas is produced, which is injected into the reduction zone, is reacted there, is withdrawn as an export gas and is supplied to a consumer, as well as a plant for carrying out the process.

2. Description of the Related Prior Art

A process of this kind is known, for instance, from Austrian Patent AT-B 390 622. According to AT-B 390 622, charging substances having largely varying grain sizes are processed, the charging substances being pre-reduced and separated by wind screening into fractions of different grain sizes, which are then completely reduced separately. However, this known one-step process only offers a low thermal utilization of the reducing gas and consequently involves an elevated consumption of reducing gas. Nor is the optimum utilization of the energy chemically bound in the reducing gas feasible.

According to Austrian Patent AT-B 387 403, siderite-containing and/or hydrated charging substances are calcined in a fixed-bed heating zone preceding the fixed-bed direct reduction zone, wherein, however, only coarse lumps of iron-ore-containing charging substances capable of being processed merely in the fixed bed are used for charging.

From U.S. Pat. No. 5,082,251, a direct reduction process is known, according to which fine ores rich in iron are reduced after complex ore preparation, such as drying, screening and breaking, in a system of whirl layer reactors in cascade arrangements by aid of reformed natural gas or oil so as to obtain a very narrow grain size distribution. Subsequently, the iron powder is hot- or cold-briquetted. Smoke gas is used as the fluidizing gas in the preheating stage, which is produced by burning air and natural gas; thus, external energy must be introduced, only the sensible heat of the whirling gases being utilizable. In contrast, reduction according to the process of the present invention is effected by means of solid carbon carriers, such as coal, and hence, according to the invention, CO reduction is preponderant, whereas, according to U.S. Pat. No. 5,082,251, the direct reduction of ore primarily is effected by $H_2$.

SUMMARY OF THE INVENTION

The invention has as its object to provide a process of the initially defined kind as well as a plant for carrying out the process, which enable the use of iron ores and fluxes comprising at least a share of fines, in an economic manner by using untreated coal as a carbon carrier, wherein the chemically bound energy (CO, $H_2$-content) still contained in the reducing gas used can be utilized.

In accordance with the invention, this object is achieved with a process of the initially defined kind in that
primarily hematite and/or magnetite fine ores and/or ore dusts are subjected to preheating by the fluidized layer method in a preheating zone,
the thus preheated charging substances are completely reduced to a major extent in at least one consecutively arranged reduction zone,
whereupon at least the more finely particulate charging substances are charged into the fluidized bed and/or, if desired, also into the fixed bed, of the melting-gasifying zone by forced conveyance, preferably by pneumatic conveyance, and are melted there.

It is essential to the present invention that the charging substances are processed not in the material counterflow as is the case with the known fixed-bed methods (AT-B 387 403), but in stable or circulating fluidized layers, i.e., for instance, in diagonal flow, thus enabling the economic processing of fine ores and ore dusts on account of the improved energetic gas utilization. This is of importance, because, at present, about 75% of the world's ores incurs as fine ore, which is cheaper than lumpy ore or agglomerates. According to the invention, not only reduction is effected by the fluidized layer method, but also preheating. By the multi-step fluidized layer method according to the invention it has become possible to use the reducing gas in an optimum manner without having to feed additional energy.

A substantial advantage of the process according to the invention is to be seen in that ore preheating is effected by means of process reducing gas from the final reduction stage and not by external gas supply as according to U.S. Pat. No. 5,082,251, which, of course, involves accordingly high costs. Another advantage of the gas control implied by the present invention resides in that pre-reduction can be achieved by the reducing atmosphere in addition to preheating, a particularly efficient utilization of the reducing gases, thus, being ensured.

To cool the reducing gas formed in the melting-gasifying zone, the reducing gas, according to the invention, partially is fed directly to the reduction zone for forming a fluidized layer and partially, after purification in a hot cyclone and in a scrubber, is admixed as a cooling gas to the first portion of the reducing gas fed to the reduction zone.

To control the state of fluidization of the charging substances in the reduction zone, a portion of the reducing gas advantageously is fed to the reduction zone in the region of the fluidized layer and part of the portion of the reducing gas supplied to the hot cyclone is fed to the reduction zone into a fluidized bed formed in the lower pan thereof.

To efficiently preheat the charging substances, the reducing gas leaving the reduction zone advantageously is fed to the preheating zone, a temperature increase being effected by the partial combustion of the reducing gas.

To efficiently use the dust and fines incurring in reduction, the reducing gas withdrawn from the reduction zone advantagously is freed from fines in a reduction cyclone and the fines separated in the reduction cyclone are completely reduced to a major extent during separation and are supplied by means of an injector to the melting-gasifying zone in the region of feeding of oxygen-containing gas.

Fines that have been completely reduced in the reduction zone already prematurely, suitably are partially discharged from the fluidized layer of the reduction zone and are supplied by means of an injector to the melting-gasifying zone in the region of feeding of oxygen-containing gas via a sleuce system, the portion of charging substances discharged from the whirl layer of the reduction zone suitably being supplied to the melting-gasifying zone together with the material separated in the reduction cyclone.

In doing so, the dust separated in the hot cyclone advantageously is supplied to the melting-gasifying zone in the region between a fine-coke fluidized bed forming there and a coarse-coke fluidized bed, via a sleuce system by aid of an injector and by means of an oxygen dust burner.

Suitably, the addition of fluxes is effected by charging a portion of the fluxes required for the melting process, together with the coal, directly into the melting-gasifying zone and a portion of the fluxes, together with the fine ore, into the preheating zone, wherein, advantageously, the fluxes charged together with the coal are introduced as coarse grains, preferably ranging between 4 mm and 12.7 mm, and the fluxes charged together with the fine ore are introduced in a fine-grain form, preferably ranging between 2 mm and 6.3 mm.

Particularly efficient reduction may be obtained by providing two locally separated consecutively arranged reduction zones, the reducing gas leaving the first reduction zone being conducted to the second reduction zone preceding the first reduction zone in the sense of the fine ore flow and from there being fed to the preheating zone under compression.

To utilize the excess gas incurring in the process, the export gas leaving the preheating zone, according to a preferred embodiment, if desired, upon admixture of a portion of the reducing gas leaving the reduction zone, after $CO_2$ purification, is used for producing hot-briquetted iron, wherein fine ore is subjected to preheating in a preheating zone, subsequently is subjected to a largely complete reduction in at least one reduction zone and, furthermore, is supplied to a compressing and briquetting means, and the export gas, upon heating, is conducted into the at least one reduction zone under formation of a fluidized bed, and, after having flown therethrough, is withdrawn from the same and is fed to the preheating zone under partial combustion with a view to temperature elevation for the purpose of forming a fluidized bed.

An arrangement for carrying out the process according to the invention, comprising at least one reduction reactor, into which a conveying duct for charging substances containing iron ore and fluxes, a gas duct for a reducing gas as well as a conveying duct for the reduction product formed therein and a gas duct for the export gas enter, and comprising a melter gasifier, into which the conveying duct conducting the reduction product from the reduction reactor enters and which comprises feed ducts for oxygen-containing gases and carbon carriers as well as taps for pig iron or steel premateral and slag, wherein the gas duct for reducing gas formed in the melter gasifier entering the reduction reactor departs from the melter gasifier, is characterized in that the reduction reactor is designed as a fluidized-layer reduction reactor and that, in the flow direction of the charging substances, a fluid-layer preheating reactor precedes the fluidized-layer reduction reactor, the gas duct of the fluidized-layer reduction reactor entering into the fluidized-layer preheating reactor, and that a pneumatic conveying duct is provided for conveying the sponge iron formed in the fluidized-layer reduction reactor into the melter gasifier, the conveying duct entering the melter gasifier on the level of the fluidized bed and/or fixed bed.

The reduction process may be controlled via the degree of fluidization prevailing within the reduction reactor (and also within the preheating reactor) advantageously in that the fluidized-layer reduction reactor comprises a lower part having a smaller diameter and an upper part following upon the lower part and having a larger diameter, the transition from the lower part to the upper part being conically designed and the gas duct for the reducing gas entering the conical transition piece, wherein the fluidized-layer preheating reactor suitably has a conical lower end into which the gas duct for the reducing gas runs.

In order to be able to discharge completely reduced fines from the fluidized-layer reduction reactor, the fluidized-layer reduction reactor, on the level of the fluidized layer, is provided with a fines discharge means, from which a conveying means leads to a pneumatic conveying means entering into the melter gasifier on the level of the fixed bed or fluidized bed formed therein.

According to a preferred embodiment, two fluidized-layer reduction reactors are consecutively provided in the flow direction of the charging substances.

A particularly efficient utilization of the excess gases forming is provided if the gas duct for the export gas, after the intermediate arrangement of a $CO_2$ scrubber and a heating means, runs into at least one reduction reactor for producing hot-briquetted iron, from which reduction reactor a gas duct is conducted into a fluidized-layer preheating reactor, wherein a fine-ore charging duct enters into the fluidized-layer preheating reactor and a conveying duct departs from the fluidized-layer preheating reactor, conducting the preheated fine ore to the reduction reactor, and if a compressing and briquetting means is arranged to follow the reduction reactor in the direction of the fine-ore flow.

Other features and advantages of the present invention will become apparent from the following description of the invention which refers to the accompanying drawings.

DETAILED DESCRIPTION OF THE PREFERRED EMBODIMENTS

Figure 1:
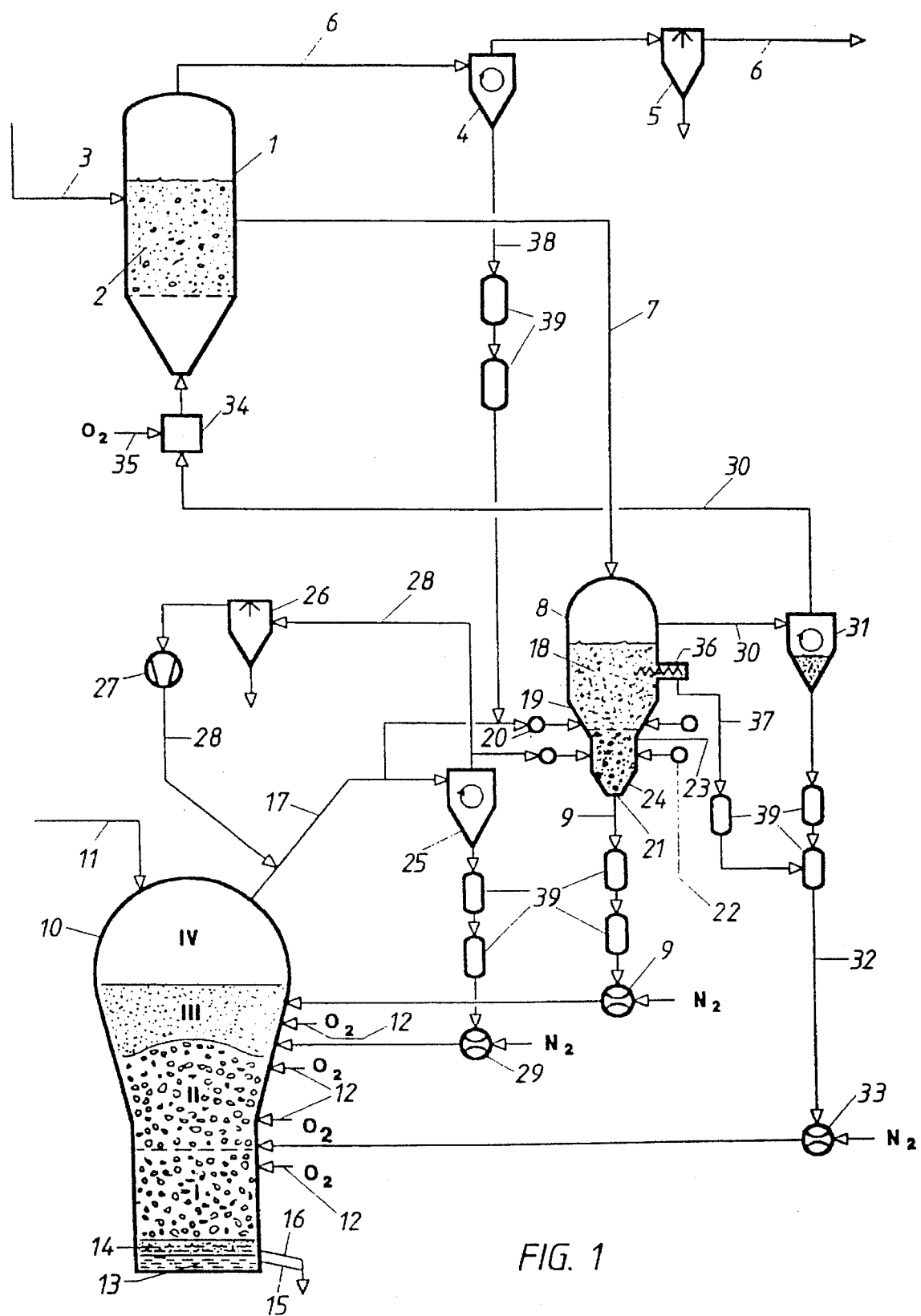
FIGS. 1 to 3 each depict an advantageous embodiment of a plant according to the invention in schematic illustration.

Referring to FIG. 1, by 1 a preheating reactor is denoted, which is designed as a fluidized-layer preheating reactor and into which charging substances containing iron ore and fluxes are chargeable via a charging duct 3 entering laterally on the level of the fluidized-bed zone 2 (preheating zone). On the upper end of the shaft-like designed fluidized-layer preheating reactor 1, the gases formed therein and flowing therethrough are withdrawn via a gas discharge duct 6 equipped with a gas purifying cyclone 4 and a gas scrubber 5, such as a Venturi scrubber. These gases are available as high-quality export gases having a caloric value of about 8000 kJ/Nm$^3$ for various purposes, e.g., for the production of current with or without oxygen.

All of the charging substances preheated in the fluidized-layer preheating reactor 1, via a conveying duct 7, reach a reduction reactor 8 also designed as a fluidized-layer reactor and are completely reduced to a major extent in the same.

Via a pneumatic sponge-iron conveying duct 9 (including an $N_2$ injector)—any other forced conveyance could be provided instead—the sponge iron formed in the fluidized-layer reduction reactor 8 gets into a melter gasifier 10 by being introduced into the same on the level of a fluidized bed III, II provided in the melter gasifier and/or on the level of a fixed bed I located therebelow. The melter gasifier comprises at least one supply duct 11 for coal and fluxes as well as tuyere feeds 12 for oxygen-containing gases arranged on several levels.

Molten pig iron 13 and liquid slag 14 collect in the melter gasifier 10 below the melting-gasifying zone formed by a fixed bed I, a coarse coke fluidized bed II located thereabove, a fine coke fluidized bed III located above the latter and a killing space IV located on top, the pig iron and the slag being tapped separately via a tapping means 15, 16 each. In the melter gasifier 10, a reducing gas is produced from the carbon carriers and from the oxygen-containing gas, which reducing gas collects in the killing space IV above the fluidized bed III and is fed to the fluidized-layer reduction reactor 8 through a gas duct 17, via a frustoconical constriction of the substantially shaft-shaped fluidized-layer reduction reactor 8, constituting a gas distributing bottom 19 and provided for the purpose of forming a fluidized layer 18 or a fluidized bed 18 (reduction zone), the reducing gas being supplied via the periphery of the constriction by means of an annular duct 20.

The large solids particles, in reduction reactor 8 which cannot be kept floating in the fluidized layer 18, centrally descend due to the effect of gravity and are withdrawn through a central solids discharge 21. This central solids discharge 21 is configured such that, via a radial gas feed means 22, a fixed-bed flow is formed into the cylindrical vessel part 23 having a conical bottom 24 and arranged below the frustoconical gas distributing bottom 19 such that the reduction even of large particles can be achieved to a satisfactory extent. Due to the frustoconical shape of the gas distributing bottom 19, the clear tube velocity changes with the height. As a result, a special grain size distribution adjusts over the height of the gas distributing bottom 19. By appropriately arranging the tuyeres in the gas distributing bottom 19, an internally circulating fluidized layer can, thus, be formed, where the gas velocity is higher in the center than on the periphery. The formation of a fluidized layer of this type may be used both for the reduction reactor 8 and for the preheating reactor 1.

A portion of the reducing gas leaving the melter gasifier 10 is subjected to purification in a hot cyclone 25, and, via a gas duct 28, to cooling in a consecutively arranged scrubber 26, and, via a compressor 27, is again admixed to the reducing gas leaving the reciter gasifier 10. The dust separated in the hot cyclone 25 is returned into the melter gasifier 10 via an $N_2$ injector 29. A portion of the still uncooled reducing gas leaving the hot cyclone 25 reaches the fluidized-layer reduction reactor 8 through its cylindrical vessel pan 23 via the gas feed means 22 formed by an annular duct.

The gas withdrawn from the fluidized-layer reduction reactor 8, via a gas duct 30, is fed to a reduction cyclone 31, in which fines still contained in the reducing gas are separated and reduced completely. These fines are introduced into the melter gasifier 10 approximately on the level of the upper end of the fixed bed I via a conveying duct 32 and an $N_2$ injector 33.

The partially oxidized reducing gas emerging from the reduction cyclone 8, via the gas duct 30, gets into the fluidized-layer preheating reactor 1, wherein, however, pan of the same is burnt for heating the reducing gas in a combustion chamber 34, into which a duct 35 feeding an oxygen-containing gas enters.

From the fluidized-layer reduction reactor 8, a portion of the completely reduced charging substances is withdrawn on the level of the whirl bed 18 by means of a worm conveyor 36 and, preferably together with the fines coming from the reduction cyclone 31, is introduced into the melter gasifier 10 approximately on the level of the upper end of the fixed bed I by means of a conveying duct 37 via an $N_2$ injector 33.

The finely particulate material separated in the cyclone 4 of the export gas discharge duct 6 is charged via a conveying duct 38 including sleuces 39—which are also provided in the other conveying ducts 32, 37 for the partially or completely reduced material—through the annular duct 20 feeding the reducing gas into the fluidized-layer reduction reactor 8.

The plant according to FIG. 1, in detail, functions as follows:

The fine ore treated—sieved and dried—and having a grain size distribution of, for instance, −0.044 mm=approx. 20%

0.044–6.3 mm=approx. 70%

6.3–12.7 mm=approx. 10% and a moisture content of approximately 2% is charged into the preheating reactor 1 pneumatically or by aid of a steep belt or vertical conveyor. There, it is prehated to a temperature of about 850° C. in the fluidized-bed zone 2 and optionally is pre-reduced on account of the reducing atmosphere to about the wuestite stage.

For this pre-reduction procedure, the reducing gas is to contain at least 25% $CO+ H_2$ in order to have sufficient reducing power.

Subsequently, the preheated and optionally pre-reduced fine ore flows into the reduction reactor 8—preferably due to gravity—, in the fluidized layer or fluidized bed 18 of which the fine ore is largely reduced to the Fe stage at a temperature of about 850° C. For this reduction procedure, the gas is to have a content of $CO+H_2$ of at least 68%.

In the reduction reactor 8, screening of the fine ore takes place, the portion of below 0.2 mm being entrained by the reducing gas into the reduction cyclone 31. There, the complete reduction of the fine ore of below 0.2 mm occurs during the separation of the solids by the cyclone effect.

The finer solids portion discharged from the fluidized layer 18 of the reduction reactor 8 by aid of the discharge worm 36 is supplied to the melter gasifier 10 in the region of the blow-in planes of the oxygen-containing gases via sleuces 39, together with the fine ore separated in the reduction cyclone 31, by aid of the $N_2$ injector 33.

The coarser solids portion from the lower region of the reduction reactor 8 is blown or charged into the melter gasifier 10 in the region of the fine-coke fluidized bed III via sleuces 39 and by aid of the $N_2$ injector 9 or by means of gravity discharge.

The dust separated in the hot cyclone 25 (primarily containing Fe and C) is fed to the melter gasifier 10 in the region between the fine-coke fluidized bed III and the coarse-coke fluidized bed II via sleuces 39 by aid of the $N_2$ injector 29 and by means of an oxygen dust burner.

For the purpose of preheating and calcining, the fluxes required for the process are charged as coarse grains, preferably having grain sizes ranging between 4 and 12.7 mm, via the coal path (11) and as fine grains, preferably having grain sizes ranging between 2 and 6.3 mm, via the fine-ore path (3).

Figure 2:
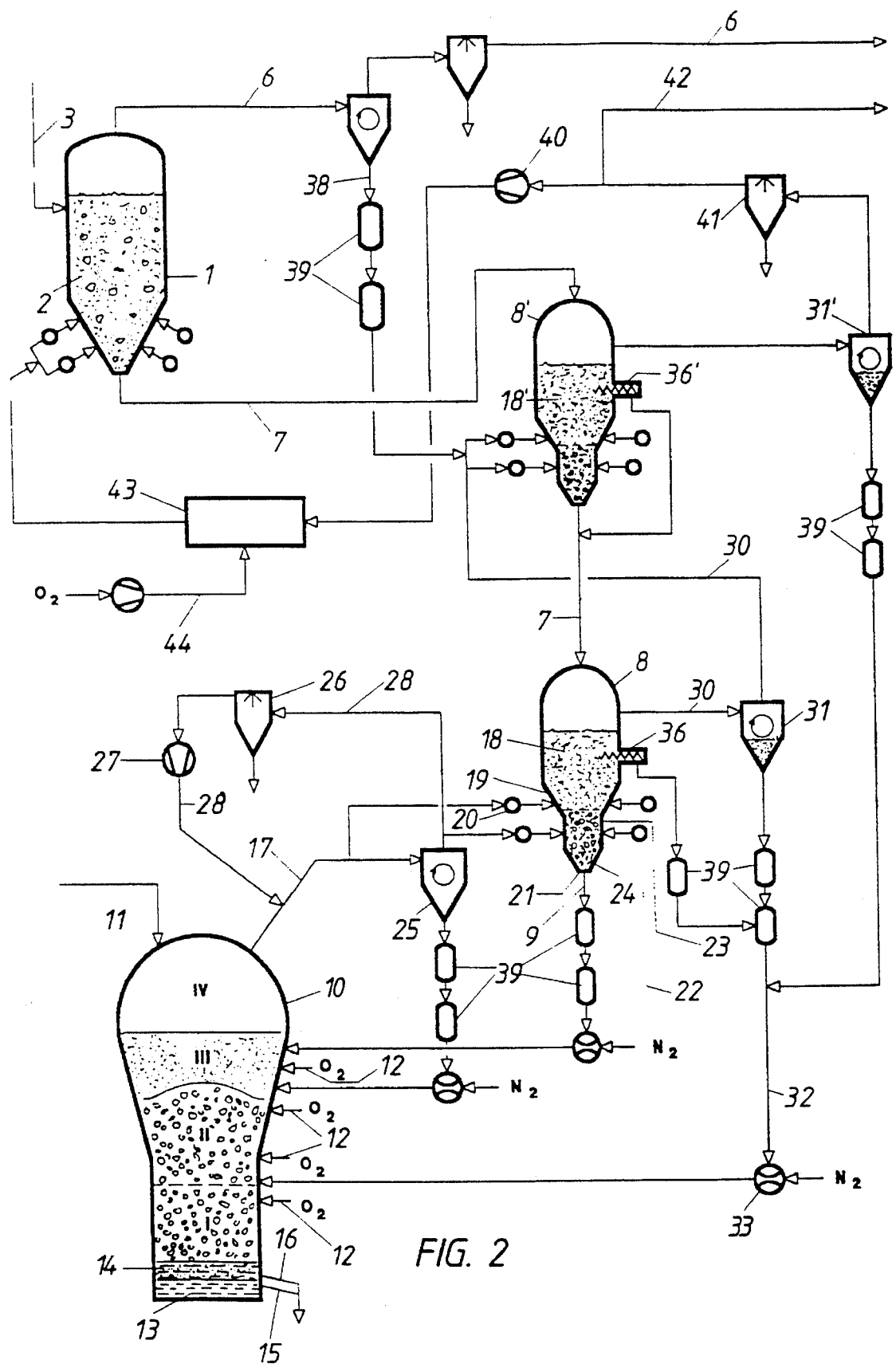

For fine ores requiring longer reduction times, a second (as well as, if required, a third) fluidized-layer reduction reactor 8' including an additional reduction cyclone 31' is provided in series or in succession to the first reduction reactor 8, as is illustrated in FIG. 2. The fine ore is reduced to the wuestite stage in the second reduction reactor 8' and to the Fe stage in the first reduction reactor 8.

In this case, the solids portion discharged from the fluidized layer 18' of the second reduction reactor by aid of the discharge worm 36' is charged into the first reduction reactor 8 by gravity, together with the coarser solids portion from the lower region of the second reduction reactor 8'. The fine ore separated in the second reduction cyclone 31' is supplied to the melter gasifier 10 in the region of the blow-in planes of the oxygen-containing gases by aid of the $N_2$ injector 33, together with the free ore separated in the first reduction cyclone 31.

If, when using two fluidized-layer reduction reactors 8, 8' and two reduction cyclones 31, 31', the operational pressure does not suffice to balance out pressure losses in the system, the gas mixture required for the preheating reactor 1, according to the invention, is brought to the necessary pressure by aid of a compressor 40. In this case, the gas from the second reduction cyclone 31' is cleaned in a scrubber 41. However, in the following, only a partial stream of the gas is compressed—a portion being withdrawn through duct 42 as export gas—and is appropriately mixed with an oxygen-containing gas fed through duct 44 in a mixing chamber 43 such that a partial combustion of the reducing gas subsequently can occur in the preheating reactor 1 for the purpose of attaining the fine-ore preheating temperature required.

The high-quality export gas from the pig iron production may be used for the production of current with or without oxygen, as indicated above. According to a preferred embodiment of the invention, which is represented in FIG. 3, the export gas, after $CO_2$ scrubbing 45 and preheating 46 to about 850° C., is re-used as a reducing gas, in the following manner:

To produce hot-briquetted iron, fine ore of the same specification as used for the production of pig iron is preheated and reduced by the reducing gas in the same aggregates as used in pig iron production. The completely reduced grain fractions from the at least one reduction reactor 8 and from the reduction cyclone 31 are blown into a charging bunker 47 by aid of $N_2$ injectors 33. Alternatively, the courser grain fraction can be charged from the lower region of the reduction reactor 8 into the charging bunker 47 by a gravity discharge.

After this, the completely reduced free ore having a degree of metallization of about 92% and a temperature of at least 750° C. reaches a roll briquetting press 49 due to gravity via a pre-compressing worm 48 including a controllable motor.

Figure 3:
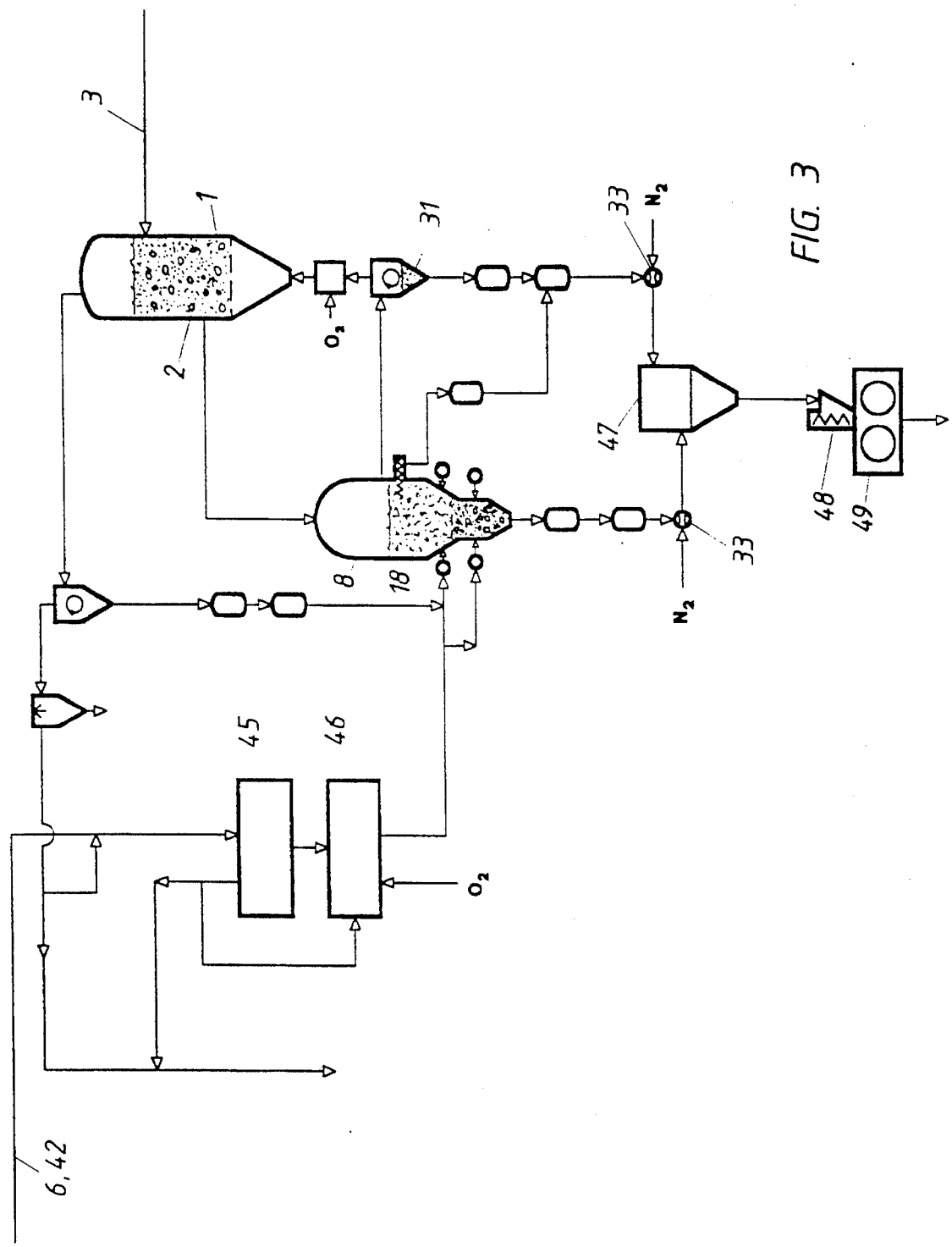

In the following examples, typical characteristic data of the process according to the invention obtained in operating the plants according to the embodiments represented in FIGS. 1 to 3 are summarized.

| Example: | |
|---|---|
| Coal analysis (dry analysis values) | |
| C | 77% |
| H | 4.5% |
| N | 1.8% |
| O | 7.6% |
| S | 0.5% |
| ashes | 9.1% |
| $C_{fix}$ | 61.5% |
| Ore analysis (moist analysis values) | |
| Fe | 62.84% |
| $Fe_2O_3$ | 87.7% |
| CaO | 0.73% |
| MgO | 0.44% |
| $SiO_2$ | 6.53% |
| $Al_2O_3$ | 0.49% |
| MnO | 0.15% |
| losses on ignition | 0.08% |
| moisture | 2% |
| Grain size distribution of fine ore | |
| +10 mm | 0% |
| 10–6 mm | 5.8% |
| 6–2 mm | 44.0% |
| 2–0.63 mm | 29.6% |
| 0.63–0.125 mm | 13.0% |
| –0.125 mm | 7.6% |
| Fluxes (dry analysis values) | |
| CaO | 45.2% |
| MgO | 9.3% |
| $SiO_2$ | 1.2% |
| $Al_2O_3$ | 0.7% |
| MnO | 0.6% |
| $Fe_2O_3$ | 2.3% |
| losses on ignition | 39.1% |

For the production of 42 tons of pig iron/hour in the plant according to FIG. 1, 42 tons of coal/hour are gassed with 29,000 $Nm^3$ $O_2$/hour. The ore consumption therefor amounts to 64 tons/hour and the consumption of fluxes is 14 tons/hour.

In addition to iron, the pig iron produced has the following composition:

| | |
|---|---|
| C | 4.2% |
| Si | 0.4% |
| P | 0.07% |
| Mn | 0.22% |
| S | 0.04% |

The export gas from the pig iron plant incurs at 87,000 $Nm^3$/hour, having the following analysis:

| | |
|---|---|
| CO | 36.1% |
| $CO_2$ | 26.9% |
| $H_2$ | 16.4% |
| $H_2O$ | 1.5% |
| $N_2$ + Ar | 18.1% |
| $CH_4$ | 1% |
| $H_2S$ | 0.02% |
| Calorific value | 6780 $kJ/Nm^3$ |

When further utilizing the export gas from the pig iron plant for the production of hot-briquetted iron according to FIG. 3, 29 tons of hot-briquetted iron/hour can be produced. The amount of recycled gas required therefor is 36,000 $Nm^3$/hour. The hot-briquetted sponge iron has the following analysis values:

| | |
|---|---|
| Metallization | 92% |
| C | 1% |
| S | 0.01% |
| P | 0.03% |

The amount of export gas from the plant for the production of hot-briquetted iron is 79,000 $Nm^3$/hour, the gas having the following composition:

| | |
|---|---|
| CO | 21.6% |
| $CO_2$ | 44.1% |
| $H_2$ | 10.6% |
| $H_2O$ | 2.8% |
| $N_2$ + Ar | 19.9% |
| $CH_4$ | 1% |
| Calorific value | 4200 $kJ/Nm^3$ |

The necessary electric input of the pig iron plant and of the plant for the production of hot-briquetted iron is 23 MW. The export gas after the plant for the production of hot-briquetted iron corresponds to a thermal output of 145 MW.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What we claim is:

1. In a plant for producing molten pig iron or liquid steel pre-products from charging substances formed of iron ores and fluxes and at least partially including fines, by directly reducing said charging substances to sponge iron, melting said sponge iron under supply of carbon carriers and oxygen-containing gas to as to obtain reducing gas, and reacting said reducing gas so as to obtain export gas, and including:

at least one reduction reactor;

a first conveying duct for said charging substances entering into said reduction reactor;

a first gas duct means for reducing gas entering into said reduction reactor;

a second conveying duct for reduction product formed in said reduction reactor entering into said reduction reactor;

a second gas duct means entering into said reduction reactor for conveying top gas; and a melter gasifier for accommodating a fluidized bed and a fixed bed, adapted to receive said second conveying duct conducting said reduction product from said reduction reactor and including feed ducts for oxygen-containing gas and carbon carriers as well as tapping means for pig iron or steel pre-material and slag, said first gas duct means for said reducing gas formed in said melter gasifier departing from said melter gasifier, wherein the improvement comprises:

said reduction reactor is a fluidized-layer reduction reactor;

a fluidized-layer preheating reactor is arranged to precede said fluidized-layer reduction reactor in the flow direction of said charging substances and is adapted to receive said second gas duct means from said fluidized-layer reduction reactor; and a pneumatic conveying duct is provided for conveying sponge iron formed in said fluidized-layer reduction reactor into said melter gasifier, said pneumatic conveying duct entering said melter gasifier on the level of at least one of said fluidized bed and said fixed bed.

2. A plant as set forth in claim 1, further comprising an oxygen conveyor running into said second gas conveyor.

3. A plant for producing molten pig iron or liquid steel pre-products from a charging substance formed of iron ores and fluxes and at least partially including fines, by directly reducing the charging substance to sponge iron, melting said sponge iron in the presence of carbon and oxygen-containing gas so as to obtain a reducing gas, and reacting said reducing gas so as to obtain an export gas, the plant comprising:

at least one fluidized-layer reduction reactor;

a first conveyor for conveying a charging substance to said reduction reactor, a first gas conveyor for conveying reducing gas to said reduction reactor;

a second conveyor for conveying reduction product away from said reduction reactor, a second gas conveyor for conveying top gas away from said reduction reactor;

a melter gasifier having a fluidized bed and a fixed bed, said melter gasifier receiving said second conveyor, an oxygen-containing gas and carbon conveyor and said first gas conveyor;

a fluidized-layer preheating reactor arranged upstream of said fluidized-layer reduction reactor and receiving said second gas conveyor; and a pneumatic conveyor for conveying sponge iron formed in said reduction reactor to at least one of said fluidized bed and said fixed bed.

4. A plant as set forth in claim 3, wherein said fluidized-layer reduction reactor comprises a smaller-diameter lower pan and a larger-diameter upper pan following said lower pan via a transition means designed as a conical transition piece, said first gas conveyor entering into said conical transition piece.

5. A plant as set forth in claim 3, wherein said fluidized-layer preheating reactor has a conical lower end said second gas conveyor entering into said conical lower end.

6. A plant as set forth in claim 3, further comprising a fines discharge means provided in said fluidized-layer reduction reactor on the level of said whirl layer, a pneumatic conveying means entering into said melter gasifier on the level of said fixed bed formed therein, and a further conveyor leading to said pneumatic conveying means.

7. A plant as set forth in claim 3, further comprising a frees discharge means provided in said fluidized-layer reduction reactor on the level of said fluidized layer, a pneumatic conveying means entering into said melter gasifier on the level of said fluidized bed formed therein, and a further conveyor leading to said pneumatic conveying means.

8. A plant as set forth in claim 3, wherein two fluidized-layer reduction reactors are provided, one fluidized-layer reduction reactor being arranged upstream of the other.

9. A plant as set forth in claim 3, further comprising:

an export gas conveyor provided for supplying said export gas to hot briquetted iron production;

a $CO_2$ scrubber and a heating means, said export gas conveyor entering at least one second reduction reactor upon intermediate arrangement of said $CO_2$ scrubber and said heating means;

a fine ore charging conveyor entering into a second fluidized-layer preheating reactor;

a fine ore conveyor adapted to convey preheated fine ore to said second reduction reactor from said second fluidized-layer preheating reactor; and a compressing and briquetting means downstream of said second reduction reactor.

10. A plant as set forth in claim 3, wherein said melter gasifier further comprises tapping means for pig iron or steel pre-material and slag.

11. A plant as set forth in claim 3, further comprising a hot cyclone, and said first gas conveyor further comprising a first branch and a second branch, said first branch running at a lower level into a lower part of said reduction reactor via said hot cyclone, and said second branch departing from said gas conveyor at a position before said hot cyclone and entering said reduction reactor at a higher level above the lower level.

* * * * *